United States Patent
Parak et al.

(10) Patent No.: US 11,492,892 B2
(45) Date of Patent: Nov. 8, 2022

(54) AUTOMATED OPTIMIZATION OF REAL-TIME DATA FREQUENCY FOR MODELING DRILLING OPERATIONS

(71) Applicant: Landmark Graphics Corporation, Houston, TX (US)

(72) Inventors: Mahdi Parak, Katy, TX (US); Srinath Madasu, Houston, TX (US); Egidio Marotta, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 195 days.

(21) Appl. No.: 16/652,336

(22) PCT Filed: May 16, 2019

(86) PCT No.: PCT/US2019/032699
§ 371 (c)(1),
(2) Date: Mar. 30, 2020

(87) PCT Pub. No.: WO2020/231441
PCT Pub. Date: Nov. 19, 2020

(65) Prior Publication Data
US 2021/0404315 A1  Dec. 30, 2021

(51) Int. Cl.
  *E21B 44/00* (2006.01)
  *E21B 44/02* (2006.01)
  *E21B 45/00* (2006.01)
  *G06N 5/00* (2006.01)

(52) U.S. Cl.
  CPC ........... *E21B 44/02* (2013.01); *E21B 45/00* (2013.01); *G06N 5/003* (2013.01); *E21B 2200/20* (2020.05); *E21B 2200/22* (2020.05)

(58) Field of Classification Search
  CPC .......... E21B 44/00; E21B 44/02; E21B 45/00; E21B 2200/20; E21B 2200/22; G06N 5/003
  See application file for complete search history.

(56) References Cited

U.S. PATENT DOCUMENTS

| | | | |
|---|---|---|---|
| 2009/0115623 A1 | 5/2009 | Macpherson et al. | |
| 2015/0226050 A1* | 8/2015 | Bartel | E21B 47/18 700/275 |
| 2015/0227841 A1* | 8/2015 | Laing | G06N 20/20 706/46 |

(Continued)

OTHER PUBLICATIONS

International Search Report and Written Opinion for PCT application PCT/US2019/032699 dated Feb. 14, 2020, 10 pages.

*Primary Examiner* — Tara Schimpf
(74) *Attorney, Agent, or Firm* — Kilpatrick Townsend & Stockton LLP (57) ABSTRACT

Systems and methods can automatically and dynamically determine an optimum frequency for data being input into a drilling optimization tool in order to provide predictive modeling for well drilling operations. The methods and systems selectively input sets of data having different frequencies into the drilling optimization tool to build different predictive models at different frequencies. An optimization algorithm such as Bayesian optimization is then applied to the models to identify in real time an optimum frequency for the data sets being input into the drilling optimization tool based on current operational and environmental parameters.

17 Claims, 5 Drawing Sheets

(56) References Cited

U.S. PATENT DOCUMENTS

| | | |
|---|---|---|
| 2016/0130937 A1 | 5/2016 | Logan et al. |
| 2016/0348499 A1 | 12/2016 | Logan et al. |
| 2018/0003043 A1 | 1/2018 | Gelman et al. |
| 2018/0334897 A1 | 11/2018 | Samuel et al. |
| 2019/0140911 A1* | 5/2019 | Jain ........................ G06N 5/003 |
| 2019/0316457 A1* | 10/2019 | Al-Rubaii ............. E21B 49/005 |

* cited by examiner

AUTOMATED OPTIMIZATION OF REAL-TIME DATA FREQUENCY FOR MODELING DRILLING OPERATIONS

TECHNICAL FIELD

The exemplary embodiments disclosed herein relate generally to the use of computer-based predictive models to optimize well drilling operations and particularly to methods and systems for automatically and dynamically determining an optimum frequency with which real-time data is input into a predictive model based on operational and environmental parameters.

BACKGROUND

Predictive modeling generally refers to the use of computers to process large amounts of data about a given system, called training data, to predict how the system will respond to a given set of inputs. Predictive modeling algorithms detect or "learn" patterns and relationships in the data that are then used to build a predictive model of the system. The predictive model, which may be a machine learning (ML)-based model, a physics-based model, a hybrid physics-based ML model, and the like, may then be employed to predict system responses to various sets of input data. Such predictive models are particularly useful for projecting the outputs of complex systems that have many different inputs influencing the output.

Predictive modeling has been advantageously implemented in a wide variety of applications, including computer virus detection, speech recognition, and market forecasting. For example, in the petroleum industry, predictive models have been used to project the rate of penetration (ROP) of well drilling operations given a set of operational parameters, such as weight-on-bit (WOB), bit rotation speed (RPM), mud or fluid flow rate, and the like. The ability to predict the ROP in real time based on a given set of operational parameters allows drilling operations to be optimized through manual and/or automatic adjusting of the operational parameters to maximize the ROP.

A potential drawback of predictive modeling is the data processing required tends to be computationally intensive and thus time consuming and expensive. This drawback is particularly acute for a complex system like an oil well where the drilling process involves many operational and environmental parameters that result in an enormous amount of drilling data being acquired in real time for input into the model. Compounding the problem, the data acquired and input into the model typically has a fixed frequency, such as one sample per second, and this frequency does not vary even when changes in operational and/or environmental parameters may permit the use of data having a lower frequency in order to reduce computational processing and hence cost.

Accordingly, a need exists for a way to automatically and dynamically determine an optimum frequency for data being input into a predictive model based on operational and environmental parameters.

BRIEF DESCRIPTION OF THE DRAWINGS

For a more complete understanding of the exemplary disclosed embodiments, and for further advantages thereof, reference is now made to the following description taken in conjunction with the accompanying drawings in which.

DESCRIPTION OF EXEMPLARY EMBODIMENTS

The following discussion is presented to enable a person skilled in the art to make and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

At a high level, the embodiments disclosed herein relate to improved methods and systems for automatically and dynamically determining an optimum frequency for data being input into a drilling optimization tool to provide predictive modeling for well drilling operations. The methods and systems selectively input sets of data having different data frequencies (i.e., resolutions) into a dynamic data frequency optimization tool to build different predictive models at different data frequencies. An optimization algorithm such as Bayesian optimization is then applied to the models to identify in real time an optimum data frequency based on current (i.e., new) operational and environmental parameters. Different optimum data frequencies may result depending on the current operational and environmental parameters for a given formation interval. The model corresponding to the optimum data frequency is then used for predictive modeling of the well drilling operations.

Figure 1:
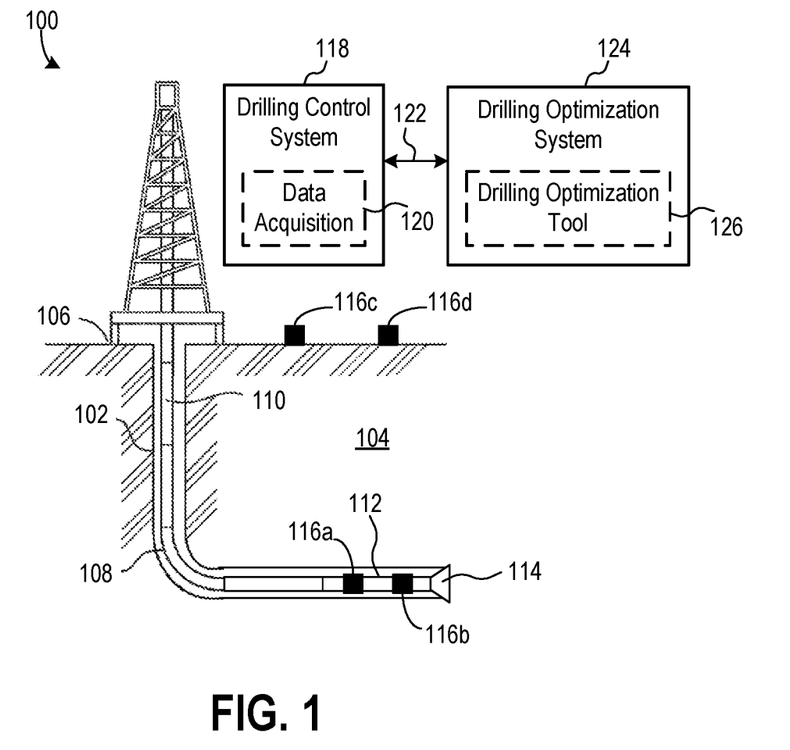
FIG. 1 illustrates an exemplary well in which a drilling optimization tool having a dynamic data frequency optimizer according to the disclosed embodiments may be used.

Referring now to FIG. 1, a drilling rig 100 for an oil, gas, water, or other type of well is shown that may be used with a drilling optimization tool having a dynamic data frequency optimizer as disclosed herein to drill a borehole 102 through a subterranean formation 104 from a surface location 106. The surface location 106 is depicted here as an onshore location, but may also be an offshore location or any other location from which the borehole 102 may be drilled. Drilling is performed using a drill string 108 composed of a continuous length of assembled pipe segments 110 suspended from the drilling rig 100. The drill string 108 typically has a downhole tool 112 attached to or forming part of a bottom-hole-assembly (BHA) 114 connected at the end of the drill string 108. One or more sensors 116a, 116b are provided on the drill string 108, typically mounted on the downhole tool 112, for measuring various operational and environmental parameters. These parameters may include WOB, RPM, mud or fluid flow rate, rock type, bore depth, and the like, as well as the ROP of the BHA 114. Additionally, one or more sensors 116c, 116d are provided on or near the surface 106 of the formation 104 for measuring seismic signals and the like. These one or more sensors 116a-d may be standalone sensors, or they may be part of a logging tool (not expressly shown) mounted in the BHA 114, or a mix of both.

Measurements from the one or more sensors 116a-d are communicated in real time to a drilling control system 118 that controls the operational parameters of the drilling operation. Communication may be done using any suitable signaling method to transmit the measurements from the sensors 116a-d to the drilling control system 118, including mud pulse telemetry, acoustic telemetry, electromagnetic telemetry, as well as signal wiring on the drill string 108 and at the surface 106, and the like. A data acquisition unit 120 of the drilling control system 118 processes and converts the sensor measurements into data reflecting the drilling operation. This drilling data may then be used by the drilling control system 118 to monitor and control the drilling operation, for example, by automatically setting and/or facilitating manual operator setting and adjustment of the WOB, RPM, mud flow rate, and/or other operational parameters based on the drilling data.

To determine which operational parameter setting or combination of settings to use for the drilling operation, the drilling control system 118 may send the drilling data from the data acquisition unit 120 in real time over a data link 122 to a drilling optimization system 124. The drilling optimization system 124 integrates the data, analyzes it, and provides feedback to the drilling control system 118 that identifies which settings should be used for the operational parameters or which adjustments should be made to achieve an optimal ROP. The feedback may be a closed-loop feedback in some embodiments where the drilling control system 118 is an automated control system that automatically implements the settings and adjustments from the drilling optimization system 124 with little or no operator intervention, or it may be feedback that an operator can implement manually using manual controls.

Within the drilling optimization system 124, a drilling optimization tool 126 inputs the drilling data from the drilling control system 118 into one or more predictive modeling algorithms to predict an ROP. These predictive modeling algorithms may include physics-based modeling algorithms as well as ML-based modeling algorithms, such as Artificial Neural Networks, Random Forests, Decision Trees, and the like. In a typical arrangement, the drilling optimization tool 126 uses the drilling data to train several predictive modeling algorithms, then selects the modeling algorithm that produces an ROP most closely matching the actual ROP (i.e., within a certain error threshold) observed by the drilling control system 118. The drilling optimization tool 126 subsequently uses the selected modeling algorithm to generate ROP predictions based on subsequent drilling data.

In accordance with one or more disclosed embodiments, the drilling optimization tool 126 can dynamically determine, based on current operational and environmental parameters, an optimum data frequency for the real-time drilling data being input into the one or more predictive modeling algorithms. Generally, other factors being equal, higher data frequency provides greater resolution and thus more accurate ROP predictions compared to lower data frequency, but also requires greater computational resources. An optimum data frequency, on the other hand, is whichever data frequency produces accurate ROP predictions within a predefined error threshold while using the least amount of computational resources. Such an optimum data frequency allows the ML-based modeling algorithms and/or the physics-based modeling algorithms to provide ROP predictions at the highest resolution based on current operational and/or environmental parameters while consuming the least amount of computational resources.

The use of an optimum data frequency is particularly advantageous when drilling through a formation interval that does not change or changes very little geologically. For such a formation interval, higher data frequency may be needed initially to ensure accurate ROP predictions, but would provide little benefit over lower data frequency as drilling continued through the formation interval. Since the formation interval varies very gradually, lower data frequency could be used in place of the higher data frequency and still provide accurate ROP predictions (within a predefined error threshold) while significantly reducing computational cost.

In addition to improved computational efficiency and reduced cost, the data frequency optimization aspects disclosed herein also allows the drilling optimization tool 126 to minimize prediction response time, as fewer computations need to be performed. This helps well engineers and operators achieve greater control over drilling operations insofar as decisions can be made and adjustments can be implemented automatically and/or manually more quickly in response to operational and/or environmental changes, events, and transitions.

And because of the increased computational efficiency, there is no need to install high-performance computers directly at the well site. Instead, the drilling optimization system 124 may be implemented using one or more remote computing systems connected to the well site over a network. Such remote computing systems may include cloud computing systems that can be scaled as needed for an entire hydrocarbon field versus individual wells in the field. Alternatively, an "edge" computing arrangement could be implemented using edge appliances that enable analytics and data processing to occur locally without having to transmit data to a remote location like the cloud. This edge computing option can be particularly effective for "mission critical" or "safety critical" applications where fast real-time analytics may be more effective than high-fidelity modeling in the cloud. This again avoids the need to install high-performance computers at the well site and also allows computational processing to be done in real time. As well, both serial and/or parallel processing architectures may be used to implement the drilling optimization system 124. An additional benefit is compatibility and applicability to a wide range of downhole tools and services, including any type or design of downhole logging while drilling (LWD) tools and services.

Figure 2:
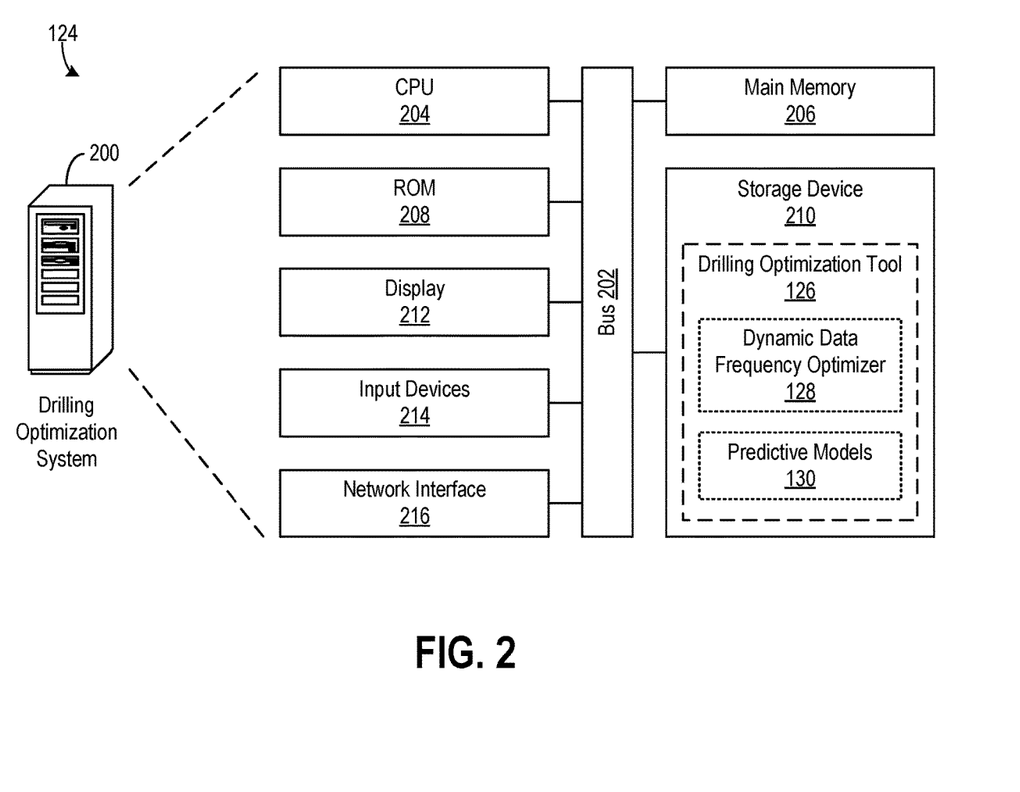
FIG. 2 illustrates an exemplary drilling optimization system that may be used to run a drilling optimization tool having a dynamic data frequency optimizer according to the disclosed embodiments.

FIG. 2 illustrates an exemplary implementation of the drilling optimization system 124 according to embodiments disclosed herein. The drilling optimization system 124 may include a conventional computing system, such as a workstation, desktop, or laptop computer, indicated at 200, or it may include a cloud-based computing system or an edge computing device. The drilling optimization system 124 may also include a custom computing system developed for a particular application. Such a drilling optimization system 124 may be located on the surface or downhole, in which case data processing occurs downhole as well. In a typical arrangement, the computing system 200 includes a bus 202 or other communication pathway for transferring information among other components within the computing system 200, and a CPU 204 coupled with the bus 202 for processing the information. The computing system 200 may also include a main memory 206, such as a random-access memory (RAM) or other dynamic storage device coupled to the bus 202 for storing computer-readable instructions to be executed by the CPU 204. The main memory 206 may also be used for storing temporary variables or other intermediate information during execution of the instructions by the CPU 204.

The computing system 200 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a display 212 for displaying information to a user. One or more input devices 214, including alphanumeric and other keyboards, mouse, trackball, cursor direction keys, and so forth, may be coupled to the bus 202 for transferring information and command selections to the CPU 204. A communications interface 216 may be provided for allowing the computing system 200 to communicate with an external system or network.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including the wires of the bus 202. Transmission itself may take the form of electromagnetic, acoustic or light waves, such as those generated for radio frequency (RF) and infrared (IR) data communications. Common forms of computer-readable media may include, for example, magnetic medium, optical medium, memory chip, and any other medium from which a computer can read.

In accordance with one or more disclosed embodiments, a drilling optimization tool 126, or the computer-readable instructions therefor, may also reside on or be downloaded to the storage device 210 for execution. As alluded to above, the drilling optimization tool 126 may include a dynamic data frequency optimizer service 128 that can dynamically determine an optimum frequency for real-time drilling data being input into one or more predictive models 130. Such a drilling optimization tool 126 may be a standalone tool or it may be integrated with other tools as part of a larger drilling optimization software package. The drilling optimization tool 126, including the dynamic data frequency optimizer service 128 and predictive models 130, may be implemented in any suitable computer programming language or software development package known to those having ordinary skill in the art, including various versions of Java, SAS, Python, C/C++/C#, R, SPSS, MATLAB, and the like.

Figure 3:
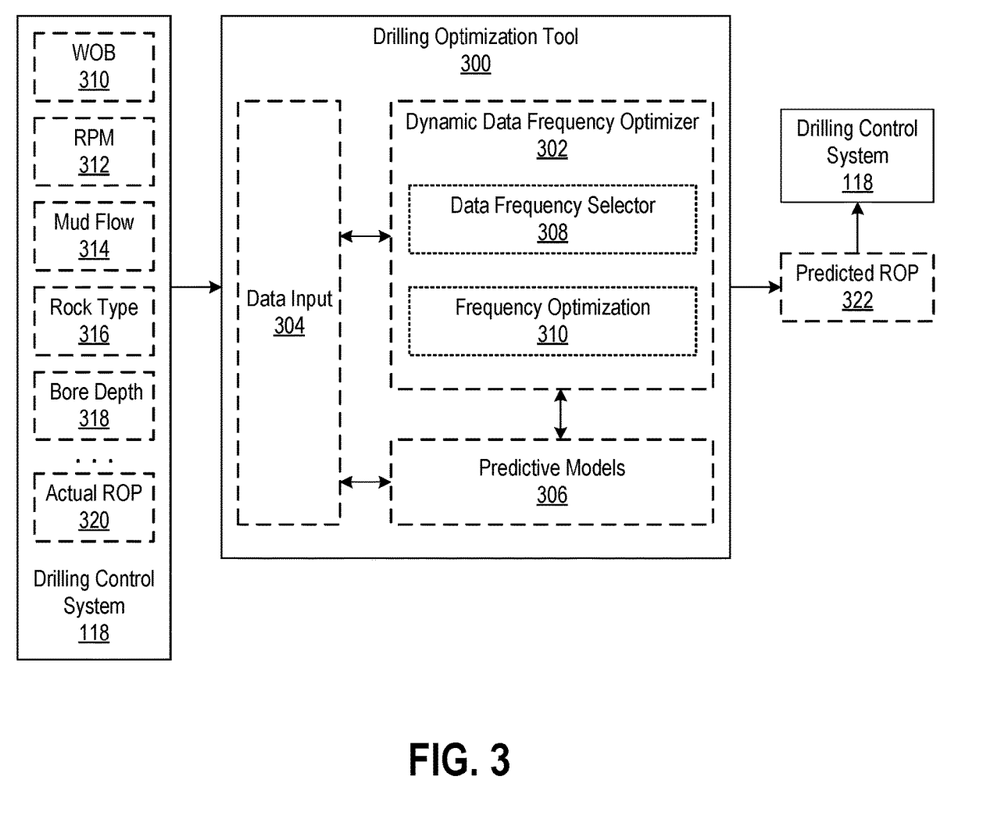
FIG. 3 illustrates an exemplary implementation of a drilling optimization tool having a dynamic data frequency optimizer according to the disclosed embodiments.

FIG. 3 illustrates an exemplary implementation of a drilling optimization tool 300 similar to the drilling optimization tool 126 discussed previously. As can be seen, the drilling optimization tool 300 has (or has access to) a dynamic data frequency optimizer service 302, a data input module 304, and one or more predictive models 306. In general, the data input module 304 is responsible for receiving real-time drilling data from the drilling control system 118 and feeding that drilling data to the one or more predictive models 306 as well as to other components of the drilling optimization tool 300. The dynamic data frequency optimizer 302 operates to determine an optimum data frequency for the real-time drilling data and a corresponding model of the one or more predictive models 306 for the optimum data frequency. That model is subsequently used to generate ROP predictions 322 that are provided to the drilling control system 118.

As can be seen, the dynamic data frequency optimizer service 302 has several functional modules, only two of which are shown here for economy, namely a data frequency selector module 308 and a frequency optimization module 310. In general operation, the data frequency selector module 308 is used to select one of several data frequencies for inputting current drilling data into the one or more predictive models 306, and the frequency optimization module 310 is used to determine in real time, based on the current drilling data, which data frequency results in a model that can subsequently produce accurate ROP predictions in the most computationally efficient manner. Examples of optimization algorithms that may be used in the optimization module 310 include Bayesian optimization, Gradient Descent optimization, Adam optimization, and any other suitable optimization algorithms known to those skilled in the art. Examples of current drilling data that may be input into the one or more predictive models 306 include operational parameters, such as WOB 310, RPM 312, and mud flow rate 314, and environmental parameters, such as rock type 316 and bore depth 318, as well as actual ROP 320.

As mentioned earlier, the drilling data is derived from sensor measurements taken by the one or more sensors 116a-d mounted on the downhole tool 112 or near the surface 106 of the formation 104 and subsequently converted into drilling data by the data acquisition unit 120 of the drilling control system 118 (see FIG. 1). Each sensor 116a-d is designed to sample or take measurements at a fairly high frequency, such as 1 measurement every 0.1 seconds (or 10 samples per second), although the sampling rate may be adjusted as needed on some sensors. Within the drilling control unit 118, the data acquisition unit 120 typically processes the sensor measurements such that the resulting drilling data has the same number of samples per second as the sensor measurements from which the drilling data came. The data acquisition unit 120 can also smooth the data (e.g., by applying well-known smoothing filters) to remove noise and variability in the measurements if needed.

The drilling data from the drilling control system 118 is then provided to the data input module 304 of the drilling optimization tool 300 for feeding to the one or more predictive models 306. In general, the data input module 304 operates to aggregate the drilling data, such as by applying a moving average or similar techniques, so that data from different types of sensors appear to have a more uniform frequency to the predictive models 306. The data frequency that the data input module 304 initially uses for the one or more predictive models 306 is the base frequency and is usually a high data frequency (e.g., 1 sample every 0.1 seconds). The data input module 304 can also be operated to use a different data frequency for the predictive models 306, such as a medium data frequency (e.g., 1 sample every 0.5 seconds) or a low data frequency (e.g., 1 sample every second).

In accordance with one or more disclosed embodiments, the dynamic data frequency optimizer 302 may select (via the data frequency selector 308) a candidate data frequency for drilling data to be used by the drilling optimization tool 300 based on which data frequency is currently being used by the drilling optimization tool 300 to generate the ROP predictions 322 that are provided to the drilling control system 118. Thus, if the drilling optimization tool 300 is currently using drilling data having a base or high data frequency, the dynamic data frequency optimizer 302 may instruct (via the data frequency selector 308) the data input module 304 to provide current drilling data with either a medium data frequency or a low data frequency (or both) to the one or more predictive models 306. The dynamic data frequency optimizer 302 then uses the high-frequency drilling data and medium-frequency drilling data or low-frequency drilling data (or both) to train the one or more predictive models 306 to generate ROP predictions. Thereafter, the dynamic data frequency optimizer 302 may apply hyper parameter tuning (via the frequency optimization module 310) to the one or more predictive models 306 to determine which data frequency resulted in a model that allowed the drilling optimization tool 300 to generate accurate ROP predictions in the most computationally efficient manner while remaining within a certain error threshold, such as a 10% error threshold. The data input module 304 is then instructed (via the data frequency selector 308) to provide to that model drilling data having the determined data frequency (e.g., high, medium, or low) until instructed otherwise.

In some embodiments, as drilling operations progress and the current operational and/or environmental parameters change, the dynamic data frequency optimizer 302 may perform verification (via the frequency optimization module 310) of whichever data frequency was determined to be the optimum data frequency to ensure that data frequency still remains the optimum data frequency. The verification may be performed in some embodiments using the base or high data frequency and the current optimum data frequency in the optimization process described above (i.e., using an optimization algorithm). In some embodiments, the verification may be performed at least once, and preferably twice, for each data frequency that was determined to be the optimum data frequency. If an optimum data frequency fails verification (i.e., it did not produce accurate ROP predictions in the most computationally efficient manner using current drilling data), then the data input module 304 is instructed (via the data frequency selector module 308) to revert back to the base or high data frequency for inputting drilling data to the one or more predictive models 306.

In some embodiments, after verification has been successfully performed and an optimum data frequency is verified, the dynamic data frequency optimizer 302 may select (via the data frequency selector module 308) another candidate data frequency for drilling data to be used by the drilling optimization tool 300. The process is then repeated as described above. Thus, for example, if the previous candidate data frequency was a medium data frequency, then the dynamic data frequency optimizer 302 selects (via the data frequency selector module 308) a low data frequency as the next candidate data frequency. In some embodiments, however, the dynamic data frequency optimizer 302 may select (via the data frequency selector module 308) the same candidate data frequency two or more times in a row before selecting a lower data frequency candidate. Thus, for example, the dynamic data frequency optimizer 302 may select (via the data frequency selector module 308) a medium data frequency candidate two or more times in a row before selecting a low data frequency candidate. This helps ensure the data frequency that the drilling optimization tool 300 uses to generate the ROP predictions 322 provided to the drilling control system 118 is not changed unduly quickly.

Figure 4:
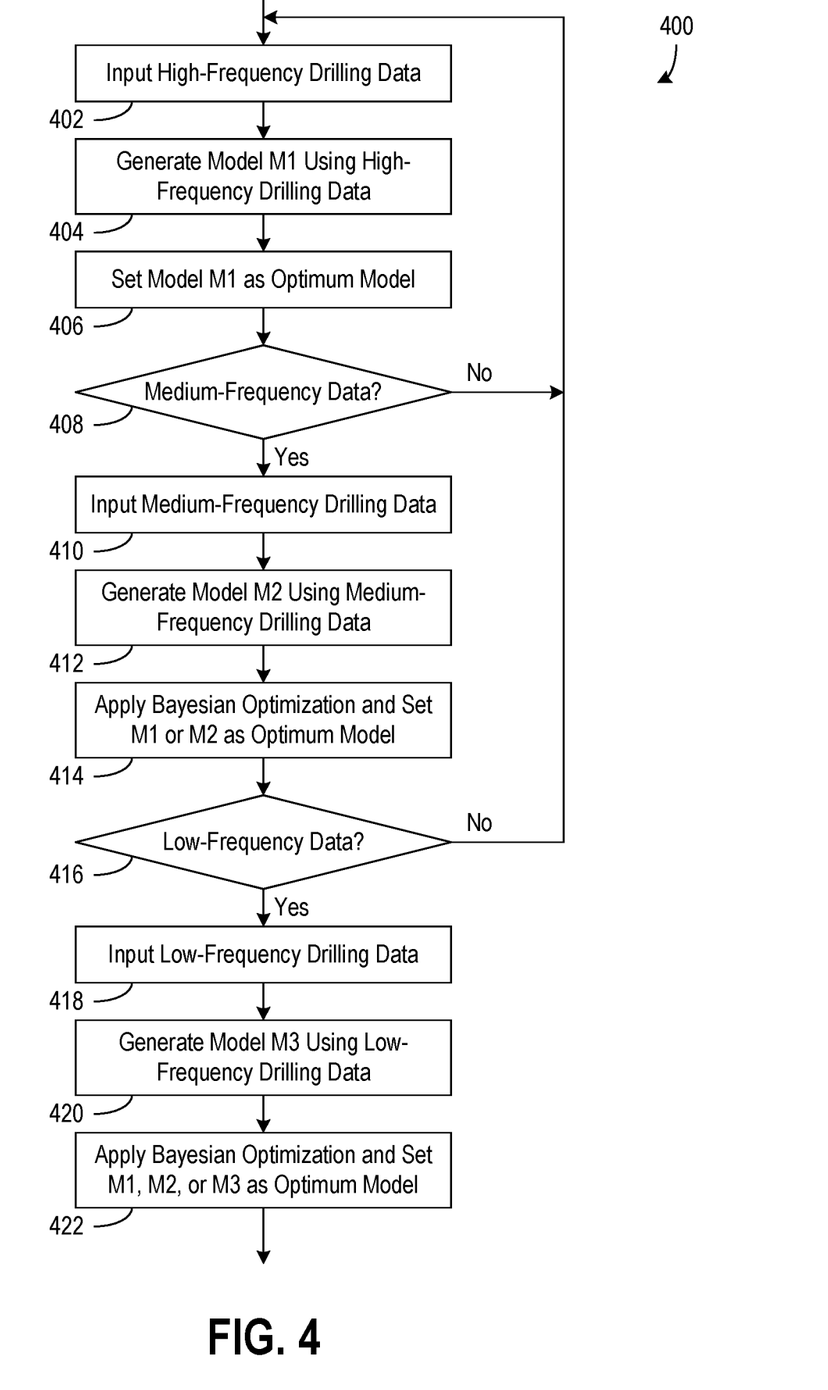
FIG. 4 illustrates an exemplary workflow for a dynamic data frequency optimizer according to the disclosed embodiments.

Basic operation of the drilling optimization tool 300 and the dynamic data frequency optimizer 302 therein is generally depicted in FIG. 4 via a flowchart 400. Frequency optimization generally begins at block 402 where high-frequency drilling data, such as 10 samples per second data, is input into the drilling optimization tool. At block 404, the drilling optimization tool generates a high data frequency predictive model M1 using the high-frequency drilling data. The drilling optimization tool then sets this predictive model M1 as the optimum predictive model at block 406.

At block 408, the drilling optimization tool determines whether medium-frequency data, such as 2 samples per second data, is available from the drilling control system. If the determination is no, then the flowchart 400 returns to block 402 and continues inputting the high-frequency drilling data.

If the determination at block 408 is yes, then the medium-frequency drilling data is input into the drilling optimization tool at block 410. At block 412, the drilling optimization tool generates a medium data frequency predictive model M2 using the medium-frequency drilling data. The drilling optimization tool then applies an optimization algorithm to the predictive models M1 and M2 to determine which model produces accurate ROP predictions in the most computationally efficient manner within a certain error threshold, such as a 10% error threshold, and sets this predictive model M1 or M2 as the optimum predictive model at block 414.

At block 416, the drilling optimization tool determines whether low-frequency data, such as 1 sample per second data, is available from the drilling control system. If the determination is no, then the flowchart 400 returns to block 410 and continues inputting the high-frequency drilling data.

If the determination at block 416 is yes, then the low-frequency drilling data is input into the drilling optimization tool at block 418. At block 420, the drilling optimization tool generates a low data frequency predictive model M3 using the low-frequency drilling data. The drilling optimization tool then applies an optimization algorithm to the predictive models M1, M2, and M3 to determine which model produces accurate ROP predictions in the most computationally efficient manner within a certain error threshold, such as a 10% error threshold, and sets this predictive model M1, M2, and M3 as the optimum predictive model at block 422.

Figure 5:
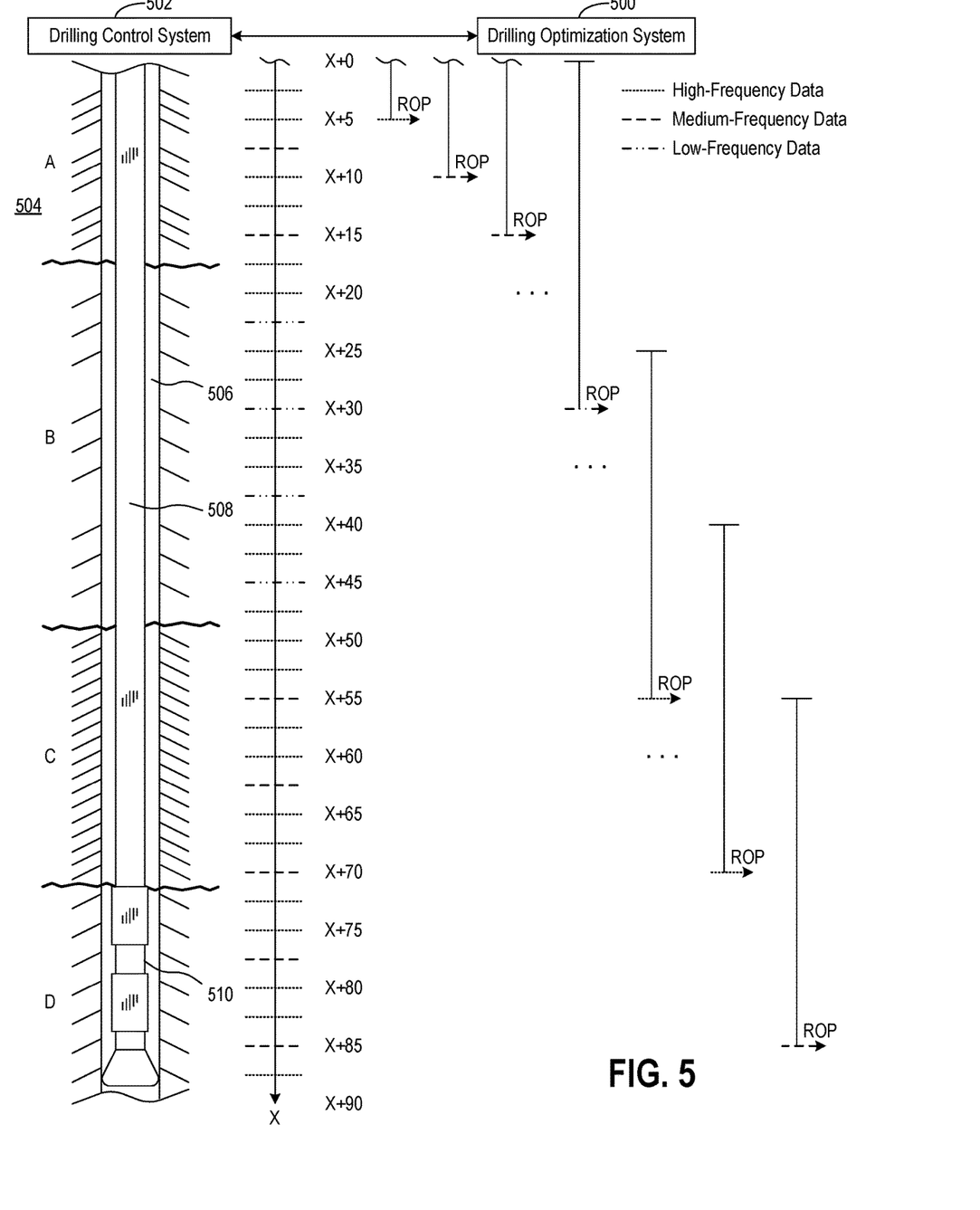
FIG. 5 illustrates an exemplary operation of a dynamic data frequency optimizer according to the disclosed embodiments.

FIG. 5 graphically depicts a specific example of a drilling optimization system 500 having a drilling optimization tool that includes a dynamic data frequency optimizer service. In this example, the drilling optimization system 500 is communicatively coupled to a drilling control system 502 that is configured to control drilling operation through a subterranean formation 504. The drilling optimization system 500 provides feedback to the drilling control system 502 that may be used to control operation of a drill string 506 based on drilling data reflecting current operational and environmental parameters in the formation 504 provided by the drilling control system 502. The data reflecting the current operational and environmental parameters is derived from sensor measurements taken by one or more sensors (not expressly shown) mounted on a downhole tool 510 as the drill string 506 passes through different formation layers A, B, C, and D in the formation 504, each layer being composed of different rock types.

In the FIG. 5 example, the drilling optimization system 500 generates ROP predictions that are provided to the drilling control system 502 every 5 units using current drilling data plus drilling data from the previous 30 units as the downhole tool 510 travels through the formation 504. In the meantime, the dynamic data frequency optimizer service independently performs data frequency optimization on a regular basis using on current drilling data. The dynamic data frequency optimizer service performs the optimization using high, medium, and/or low-frequency drilling data to determine which data frequency and hence which predictive model is optimum based on current operational and environmental parameters. The determined high, medium, or low data frequency predictive model is then fed high, medium, or low-frequency drilling data to generate the ROP predictions that are passed to the drilling control system 502. Performing the optimization on a regular basis using current drilling data allows the dynamic data frequency optimizer service to continuously (or near continuously) verify whether the current model selection remains valid or needs to be modified.

In some embodiments, the dynamic data frequency optimizer verifies whether the current model selection remains valid as the downhole tool 510 travels through the formation 504 by using high-frequency drilling data as the default baseline or standard against which to compare predictions from medium and low-frequency drilling data (and corresponding models). While high-frequency drilling data usually produces the most accurate ROP predictions, it may not produce the most computationally efficient predictions given the huge amount of computational capacity required. Therefore, if medium or low-frequency drilling data can produce accurate ROP predictions for a given formation interval within an error threshold (i.e., relative to actual ROP), then the dynamic data frequency optimizer sets the medium or low-frequency drilling data (and corresponding models) as the data frequency to be used for the ROP predictions provided to the drilling control system 502. Otherwise, the dynamic data frequency optimizer defaults to high-frequency drilling data (and corresponding models). Thus, the optimum data frequency (and corresponding models) is the frequency that produces accurate ROP predictions for a given formation interval (i.e., within an error threshold) in the most computationally efficient manner.

The dynamic data frequency optimizer service can be seen at line X in FIG. 5 where X may represent depth units (e.g., feet), time units (e.g., seconds), or any other suitable measurement units. As can be seen, the drilling optimization tool 500 generates an ROP prediction at X+5 in formation layer A using current high-frequency drilling data plus high-frequency drilling data from the previous 30 units. In the meantime, the dynamic data frequency optimizer has obtained and performed an optimization using medium-frequency drilling data and has determined that the medium-frequency drilling data is actually the optimum data frequency for this formation interval (i.e., formation layer A). The drilling optimization tool 500 accordingly generates the next ROP prediction at X+10 using medium-frequency drilling data. Meanwhile, the dynamic data frequency optimizer uses high-frequency drilling data to perform two (or at least one) verifications of the medium-frequency drilling data to see if that frequency is still the optimum data frequency. The ROP prediction at X+15 indicates that medium-frequency drilling data was indeed still set as the optimum data frequency.

Next, the dynamic data frequency optimizer obtains and performs a second optimization using medium-frequency drilling data and determines that medium-frequency drilling data is again the optimum data frequency for the current formation interval (i.e., formation layer A). And again, two verifications are performed using high-frequency drilling data.

After two optimizations have been performed using medium-frequency drilling data, the dynamic data frequency optimizer obtains and performs an optimization using low-frequency drilling data. This optimization occurs at some point between X+20 and X+25 in the present example and shows that low-frequency drilling data is the optimum data frequency for the current formation interval (i.e., formation layer B). Once again, two (or at least one) verifications are performed using high-frequency drilling data before the dynamic data frequency optimizer performs another optimization using low-frequency drilling data. The above optimization service thereafter continues as described.

Note that shortly after the transition from formation layer B to formation layer C, the verification process fails to verify that low-frequency drilling data remains the optimum data frequency. The dynamic data frequency optimizer accordingly defaults to high-frequency drilling data as the optimum data frequency at this point. As a result, the next ROP prediction generated by the drilling optimization tool 500 (at X+55) uses high-frequency drilling data. The optimization service thereafter continues as described above.

Thus, by using the dynamic data frequency optimizer disclosed herein to identify an optimum data frequency (instead of always using the highest data frequency), predictive modeling of drilling operations may be performed in a more computationally efficient manner. This computational efficiency helps conserve computing resources by allowing an appropriate (i.e., reduced) data frequency to be used based on the requirements of current operational and environmental parameters rather than fixedly employing high-frequency drilling data. Such a flexible arrangement also allows ROP predictions with greater accuracy to be provided more quickly compared to a fixed data frequency approach.

It should be noted that while a number of specific implementations of a drilling optimization system having a drilling optimization tool that includes a dynamic data frequency optimizer service have been described. Those having ordinary skill in the art will understand that modifications and alternatives may be made without departing from the scope of the disclosed embodiments. For example, while specific data frequencies have been disclosed, such as 10, 2, and 1 sample(s) per second, other data frequencies may certainly be used for the frequency optimization described herein. In addition, while one or more embodiments may perform two verifications of the medium-frequency drilling data and/or the low-frequency drilling data, that number of verifications may be increased or decreased as needed for a particular implementation. Moreover, while the frequency optimization herein has been described as occurring after at least two sets of medium-frequency and/or low-frequency drilling data has been inputted into the dynamic data frequency optimizer, that number of data sets may be increased or decreased as needed for a particular implementation.

Accordingly, as set forth above, the embodiments disclosed herein may be implemented in a number of ways. For example, in general, in one aspect, the disclosed embodiments relate to a drilling optimization system for optimizing a drilling operation in a subterranean formation. The system comprises, among other things, a communication link configured to connect the drilling optimization system to a drilling control system, the drilling control system operable to control one or more operational parameters of the drilling operation. The system also comprises a drilling optimization tool operable to receive drilling data for the drilling operation from the drilling control system, the drilling data representing the one or more operational parameters and one or more environmental parameters of the drilling operation, the drilling optimization tool operable to generate rate of penetration (ROP) predictions for the drilling operation using the drilling data. The system further comprises a data frequency optimizer operable to determine in real time which of a first data frequency and a second data frequency is to be used by the drilling optimization tool by determining which of the first data frequency and the second data frequency allows the drilling optimization tool to generate accurate ROP predictions more computationally efficiently within a predefined prediction error threshold. The drilling optimization system is operable to communicate to the drilling control system ROP predictions that are generated by the drilling optimization tool using drilling data having the first data frequency or the second data frequency as determined by the data frequency optimizer.

In one or more embodiments of the drilling optimization system, the drilling optimization tool is operable to use drilling data having the first data frequency or the second data frequency as determined by the data frequency optimizer to train one of a physics-based modeling algorithm, a machine learning (ML)-based modeling algorithm, or a hybrid physics-based ML algorithm, and/or the drilling data includes drilling data having a third data frequency that is different from the first data frequency and the second data frequency, the data frequency optimizer operable to determine which of the first data frequency, the second data frequency, or the third data frequency allows the drilling optimization tool to generate accurate ROP predictions more computationally efficiently within the predefined prediction error threshold.

In one or more embodiments of the drilling optimization system, the first data frequency is higher than the second data frequency and the second data frequency is higher than the third data frequency, the data frequency optimizer is operable to apply an optimization algorithm to drilling data having the first data frequency and drilling data having the second data frequency to determine which data frequency allows the drilling optimization tool to generate accurate ROP predictions more computationally efficiently within a predefined prediction error threshold, and/or the drilling control system is operable to automatically control one or more operational parameters of the drilling operation based on the ROP predictions from the drilling optimization system.

In general, in another aspect, the disclosed embodiments relate to a method for optimizing a drilling operation in a subterranean formation. The method comprises, among other things, connecting a drilling optimization system to a drilling control system over a communication link, the drilling control system operable to control one or more operational parameters of the drilling operation, and receiving, by a drilling optimization tool of the drilling optimization system, drilling data for the drilling operation from the drilling control system, the drilling data representing the one or more operational parameters and one or more environmental parameters of the drilling operation. The method also comprises determining, by a data frequency optimizer of the drilling optimization tool in real time, which of a first data frequency and a second data frequency is to be used by the drilling optimization tool by determining which of the first data frequency and the second data frequency allows the drilling optimization tool to generate accurate ROP predictions more computationally efficiently within a predefined prediction error threshold. The method further comprises generating, by the drilling optimization tool, rate of penetration (ROP) predictions for the drilling operation using drilling data having the first frequency or the second frequency as selected by the data frequency optimizer, and communicating, from the drilling optimization system to the drilling control system, the ROP predictions that are generated by the drilling optimization tool using the drilling data having the first data frequency or the second data frequency as selected by the data frequency optimizer.

In one or more of the foregoing embodiments, the method further comprising using, by the drilling optimization tool, the drilling data having the first data frequency or the second data frequency as selected by the data frequency optimizer to train one of a physics-based modeling algorithm, a machine learning (ML)-based modeling algorithm, or a hybrid physics-based ML algorithm.

In one or more of the foregoing embodiments, the drilling data includes drilling data having a third data frequency that is different from the first data frequency and the second data frequency, further comprising determining, by the data frequency optimizer, which of the first data frequency, the second data frequency, or the third data frequency allows the drilling optimization tool to generate accurate ROP predictions more computationally efficiently within the predefined prediction error threshold, and/or the first data frequency is higher than the second data frequency and the second data frequency is higher than the third data frequency.

In one or more of the foregoing embodiments, the method further comprises applying, by the data frequency optimizer, an optimization algorithm to drilling data having the first data frequency and drilling data having the second data frequency to determine which data frequency allows the drilling optimization tool to generate accurate ROP predictions more computationally efficiently within a predefined prediction error threshold; and/or wherein the drilling control system is operable to automatically control one or more operational parameters of the drilling operation based on the ROP predictions from the drilling optimization system.

In general, in another aspect, the disclosed embodiments relate to a data frequency optimizer for a drilling optimization tool. The data frequency optimizer comprises, among other things, a data frequency selector module operable to select a candidate data frequency to be used by the drilling optimization tool based on a current data frequency being used by the drilling optimization tool, the candidate data frequency being lower than the current data frequency. The data frequency optimizer further comprises a frequency optimization module operable to determine which of the candidate data frequency and the current data frequency allows the drilling optimization tool to generate accurate ROP predictions more computationally efficiently within a predefined prediction error threshold. The drilling optimization tool uses drilling data having the candidate data frequency or the current data frequency as determined by the optimization module to generate ROP predictions, the drilling data representing one or more operational parameters and one or more environmental parameters of a drilling operation.

In one or more embodiments of the data frequency optimizer, the frequency optimization module is further operable to perform verification, using a base data frequency, that whichever data frequency is being used by the drilling optimization tool to generate ROP predictions continues to be the data frequency that allows the drilling optimization tool to generate accurate ROP predictions more computationally efficiently within a predefined prediction error threshold, and/or the data frequency selector module is operable to select the candidate data frequency only after the frequency optimization module has successfully performed verification at least once for a previous candidate data frequency.

In one or more embodiments of the data frequency optimizer, the frequency optimization module determines which data frequency allows the drilling optimization tool to generate accurate ROP predictions more computationally efficiently within a predefined prediction error threshold by applying an optimization algorithm to the drilling data having the candidate data frequency and the drilling data having the current data frequency, and/or the data frequency selector module selects the same candidate data frequency two or more times before selecting a different candidate data frequency.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A drilling optimization system for optimizing a drilling operation in a subterranean formation, comprising:
    a communication link configured to connect the drilling optimization system to a drilling control system, the drilling control system operable to control one or more operational parameters of the drilling operation;
    a drilling optimization tool operable to receive drilling data for the drilling operation from the drilling control system, the drilling data representing the one or more operational parameters and one or more environmental parameters of the drilling operation, the drilling optimization tool operable to generate rate of penetration (ROP) predictions for the drilling operation using the drilling data; and
    a data frequency optimizer operable to determine in real time which of a first data sampling frequency and a second data sampling frequency of the drilling data is to be used by the drilling optimization tool by determining which of the first data sampling frequency and the second data sampling frequency allows the drilling optimization tool to generate accurate ROP predictions more computationally efficiently within a predefined prediction error threshold;
    wherein the drilling optimization system is operable to communicate to the drilling control system the ROP predictions that are generated by the drilling optimization tool using the drilling data sampled at the first data sampling frequency or the second data sampling frequency as determined by the data frequency optimizer.

2. The drilling optimization system of claim 1, wherein the drilling optimization tool is operable to use the drilling data sampled at the first data sampling frequency or the second data sampling frequency as determined by the data frequency optimizer to train one of a physics-based modeling algorithm, a machine learning (ML)-based modeling algorithm, or a hybrid physics-based ML algorithm.

3. The drilling optimization system of claim 1, wherein the drilling data includes the drilling data sampled at a third data sampling frequency that is different from the first data sampling frequency and the second data sampling frequency, the data frequency optimizer operable to determine which of the first data sampling frequency, the second data sampling frequency, or the third data sampling frequency allows the drilling optimization tool to generate accurate ROP predictions more computationally efficiently within the predefined prediction error threshold.

4. The drilling optimization system of claim 3, wherein the first data sampling frequency is higher than the second data sampling frequency and the second data sampling frequency is higher than the third data sampling frequency.

5. The drilling optimization system of claim 1, wherein the data frequency optimizer is operable to apply an optimization algorithm to the drilling data sampled at the first data sampling frequency and the drilling data sampled at the second data sampling frequency to determine which data sampling frequency allows the drilling optimization tool to generate accurate ROP predictions more computationally efficiently within the predefined prediction error threshold.

6. The drilling optimization system of claim 1, wherein the drilling control system is operable to automatically control the one or more operational parameters of the drilling operation based on the ROP predictions from the drilling optimization system.

7. A method for optimizing a drilling operation in a subterranean formation, comprising:
    connecting a drilling optimization system to a drilling control system over a communication link, the drilling control system operable to control one or more operational parameters of the drilling operation;
    receiving, by a drilling optimization tool of the drilling optimization system, drilling data for the drilling operation from the drilling control system, the drilling data representing the one or more operational parameters and one or more environmental parameters of the drilling operation;
    determining, by a data frequency optimizer of the drilling optimization tool in real time, which of a first data sampling frequency and a second data sampling frequency of the drilling data is to be used by the drilling optimization tool by determining which of the first data sampling frequency and the second data sampling frequency allows the drilling optimization tool to generate accurate ROP predictions more computationally efficiently within a predefined prediction error threshold;
    generating, by the drilling optimization tool, rate of penetration (ROP) predictions for the drilling operation using the drilling data sampled at the first data sampling frequency or the second data sampling frequency as selected by the data frequency optimizer; and
    communicating, from the drilling optimization system to the drilling control system, the ROP predictions that are generated by the drilling optimization tool using the drilling data sampled at the first data sampling frequency or the second data sampling frequency as selected by the data frequency optimizer.

8. The method of claim 7, further comprising using, by the drilling optimization tool, the drilling data sampled at the first data sampling frequency or the second data sampling frequency as selected by the data frequency optimizer to train one of a physics-based modeling algorithm, a machine learning (ML)-based modeling algorithm, or a hybrid physics-based ML algorithm.

9. The method of claim 7, wherein the drilling data includes the drilling data sampled at a third data sampling frequency that is different from the first data sampling frequency and the second data sampling frequency, further comprising determining, by the data frequency optimizer, which of the first data sampling frequency, the second data sampling frequency, or the third data sampling frequency allows the drilling optimization tool to generate accurate ROP predictions more computationally efficiently within the predefined prediction error threshold.

10. The method of claim 9, wherein the first data sampling frequency is higher than the second data sampling frequency and the second data sampling frequency is higher than the third data sampling frequency.

11. The method of claim 7, further comprising applying, by the data frequency optimizer, an optimization algorithm to the drilling data sampled at the first data sampling frequency and the drilling data sampled at the second data sampling frequency to determine which data sampling frequency allows the drilling optimization tool to generate accurate ROP predictions more computationally efficiently within the predefined prediction error threshold.

12. The method of claim 7, wherein the drilling control system is operable to automatically control the one or more operational parameters of the drilling operation based on the ROP predictions from the drilling optimization system.

13. A data frequency optimizer for a drilling optimization tool, comprising:
a data frequency selector module operable to select a candidate data sampling frequency to be used by the drilling optimization tool based on a current data sampling frequency being used by the drilling optimization tool, the candidate data sampling frequency being lower than the current data sampling frequency; and
a frequency optimization module operable to determine which of the candidate data sampling frequency and the current data sampling frequency allows the drilling optimization tool to generate accurate ROP predictions more computationally efficiently within a predefined prediction error threshold;
wherein the drilling optimization tool uses drilling data sampled at the candidate data sampling frequency or the current data sampling frequency as determined by the frequency optimization module to generate ROP predictions, the drilling data representing one or more operational parameters and one or more environmental parameters of a drilling operation.

14. The data frequency optimizer of claim 13, wherein the frequency optimization module is further operable to perform verification, using a base data sampling frequency, that whichever data sampling frequency is being used by the drilling optimization tool to generate ROP predictions continues to be the data sampling frequency that allows the drilling optimization tool to generate accurate ROP predictions more computationally efficiently within the predefined prediction error threshold.

15. The data frequency optimizer of claim 14, wherein the data frequency selector module is operable to select the candidate data sampling frequency only after the frequency optimization module has successfully performed verification at least once for a previous candidate data sampling frequency.

16. The data frequency optimizer of claim 13, wherein the frequency optimization module determines which data sampling frequency allows the drilling optimization tool to generate accurate ROP predictions more computationally efficiently within the predefined prediction error threshold by applying an optimization algorithm to the drilling data sampled at the candidate data sampling frequency and the drilling data sampled at the current data sampling frequency.

17. The data frequency optimizer of claim 13, wherein the data frequency selector module selects the same candidate data sampling frequency two or more times before selecting a different candidate data sampling frequency.

\* \* \* \* \*